(12) United States Patent
Dorai et al.

(10) Patent No.: US 12,141,098 B2
(45) Date of Patent: Nov. 12, 2024

(54) CONTENT HIDING SOFTWARE IDENTIFICATION AND/OR EXTRACTION SYSTEM AND METHOD

(71) Applicant: The Florida State University Research Foundation, Inc., Tallahassee, FL (US)

(72) Inventors: Gokila Dorai, Tallahassee, FL (US); Sudhir Aggarwal, Tallahassee, FL (US); Charisa Powell, Tallahassee, FL (US); Neet Patel, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 17/854,793

(22) Filed: Jun. 30, 2022

(65) Prior Publication Data

US 2023/0012801 A1 Jan. 19, 2023

Related U.S. Application Data

(60) Provisional application No. 63/216,767, filed on Jun. 30, 2021.

(51) Int. Cl.
| | |
|---|---|
| *G06F 16/00* | (2019.01) |
| *G06F 16/14* | (2019.01) |
| *G06F 18/23* | (2023.01) |
| *G06F 30/27* | (2020.01) |

(52) U.S. Cl.
CPC ............ *G06F 16/156* (2019.01); *G06F 18/23* (2023.01); *G06F 30/27* (2020.01)

(58) Field of Classification Search
CPC ....................................................... G06F 30/27
See application file for complete search history.

(56) References Cited

U.S. PATENT DOCUMENTS

| | | | |
|---|---|---|---|
| 2009/0307078 A1* | 12/2009 | Mithal | H04L 12/14 705/26.1 |
| 2016/0337390 A1* | 11/2016 | Sridhara | H04W 12/128 |
| 2020/0233935 A1* | 7/2020 | Wei | G06F 40/289 |

OTHER PUBLICATIONS

Apple, 2019a. App store improvements [online] https://developer.apple.com/support/app-store-improvements/ (2019).
Apple, 2019b Apple Categories and Discoverability—App Store—Apple Developer (2019) https://developer.apple.com/app-store/categories/.
Apple, 2019c. Change your Apple ID country or region [Online]. https://support.apple.com/en-us/HT201389.
Apple, 2019d. More malicious apps found in mac app store that are stealing user data [online]. https://appleinsider.com/articles/18/09/07/more-malicious-appsfound-in-mac-app-store-that-are-stealing-user-data.
Applebetas, 2018. MTerminal [Online]. https://github.com/AppleBetas/MTerminal-Jailed/.

(Continued)

*Primary Examiner* — Ajith Jacob
(74) *Attorney, Agent, or Firm* — Meunier Carlin & Curfman LLC

(57) ABSTRACT

An exemplary system and method facilitate the identify and/or extract content hiding software, e.g., in a software curation environment (e.g., Apple's App Store). In some embodiments, the exemplary system and method may be applied to U.S.-based platforms as well as international platforms in Russia, India, China, among others.

17 Claims, 5 Drawing Sheets

(56) References Cited

OTHER PUBLICATIONS

Azadegan, S., Yu, W., Liu, H., Sistani, M., Acharya, S., 2012. Novel anti-forensics approaches for smart phones. In: 2012 45th Hawaii International Conference on System Sciences. IEEE, pp. 5424e5431.
Bader, M., Baggili, I., 2010. iPhone 3GS forensics: logical analysis using apple iTunes backup utility. In: Small scale digital device forensics journal, 4, pp. 1e15, 1.
Cellebrite, 2018. Cellebrite. http://www.cellebrite.com. (Accessed Jan. 1, 2019).
Data VizInc, 2017. Passwords Plus—Free Secure Vault on the App Store (Version 4.001). https://itunes.apple.com/us/app/passwords-plus-free-secure-vault/id486941825?mt$^1$/$_4$8. (Accessed May 21, 2019).
Davey Winder, CyberSecurity, F., 2019. Apple app store security bypassed by government ios surveillance malware [online]. https://www.forbes.com/sites/daveywinder/2019/04/09/apple-app-store-security-bypassed-by-governmentios-surveillance-malware-what-you-need-to-know/#3132b6b91b82.
De Raedt, L., Passerini, A., Teso, S., 2018. Learning constraints from examples. In: Thirty-Second AAAI Conference on Artificial Intelligence.
Distefano, A., Me, G., Pace, F., 2010. Android anti-forensics through a local paradigm. In: Digital Investigation. Proceedings of the 10th Annual DFRWS Conference, vol. 7. Elsevier, pp. S83eS94.
Duncan, M., Karabiyik, U., 2018. Detection and recovery of anti-forensic (vault) applications on android devices. In: Proceedings of the Annual ADFSL Conference on Digital Forensics, vol. 6. Security and Law.
Freeman, J., 2018a. Cydia [online]. https://cydia.saurik.com.
Freeman, J., 2018b. Impactor [online]. http://www.cydiaimpactor.com.
Gorla, A., Tavecchia, I., Gross, F., Zeller, A., 2014. Checking app behavior against app descriptions. In: Proceedings of the 36th International Conference on Software Engineering. ACM, pp. 1025e1035.
Gummybearstudios, 2018. My Secret Notes on the App Store, version 2.0.2. https://itunes.apple.com/us/app/my-secret-notes/id437215704?mt=8 (Accessed May 21, 2019).
Harris, R., 2006. Arriving at an anti-forensics consensus: examining how to define and control the anti-forensics problem. Digit. Invest. 3, 44e49.
Idea-Solutions, 2018. Secret Photos—Kyms on the App Store, version 3.4.7. https://itunes.apple.com/US/app/secret-photos-kyms/id471303390?mt$^1$/$_4$8. (Accessed May 21, 2019).
Jailbreak11, 2018. ZJailbreak [Online]. http://zjailbreak.com.
Kanzelsberger, 2014. Mywallet Lite—Secure Password Manager, version 1.5.6. https://itunes.apple.com/us/app/mywallet-lite-secure-password-manager/id423959784?mt$^1$/$_4$8. (Accessed May 21, 2019).
Kolb, S., Paramonov, S., Guns, T., De Raedt, L., 2017. Learning constraints in spreadsheets and tabular data. Mach. Learn. 106 (9-10), 1441e1468.
Murphy, C., 2016. 'What You're Missing in Hidden Apps (And 5 Data Forensic Tools!)'. https://www.officer.com/command-hq/technology/computerssoftware/data-forensics/article/12203542/hidden-mobile-apps-mobileinvestigations-forensic-data-tools.
Oxygen, 2018. Oxygen. https://www.oxygen-forensic.com/en/. (Accessed Nov. 3, 2018).
Pandita, R., Xiao, X., Yang, W., Enck, W., Xie, T., 2013. WHYPER: towards automating risk assessment of mobile applications. In: Presented as Part of the 22$^{nd}$ USENIX Security Symposium (USENIX Security 13), pp. 527e542. Paraben, 2018. Paraben. https://shop.paraben.com. (Accessed Dec. 6, 2018).
Penzuinc, 2018. Penzu on the App Store, version 3.5. https://itunes.apple.com/us/app/penzu-free-diary-private-journal/id452674732?mt$^1$/$_4$8. (Accessed May 21, 2019).
Piccinelli, M., Gubian, P., 2011. Exploring the iphone backup made by itunes. J. Digit. Forensics Secur. Law 6 (3), 4.
Qu, Z., Rastogi, V., Zhang, X., Chen, Y., Zhu, T., Chen, Z., 2014. Autocog: measuring the description-to-permission fidelity in android applications. In: Proceedings of the 2014 ACM SIGSAC Conference on Computer and Communications Security. ACM, pp. 1354e1365.
RedKnight, 2018. My Secret Folder on the App Store, version 2.0.3. https://apps.apple.com/us/app/my-secret-folder/id489803044 (Accessed May 21, 2019).
Rughani, D.P., 2017. Forensic analysis of content hiding android applications. Int. J. Adv. Res. Comput. Sci. Software Eng. 7, 404e408.
Savysoda, 2017. Private Browsing White (Version 11.1). https://itunes.apple.com/us/app/private-browsing-white/id428855226?mt$^1$/$_4$8. (Accessed Jan. 18, 2020).
Tan, P.-N., 2018. Introduction to Data Mining. Pearson Education.
Tso, Y.-C., Wang, S.-J., Huang, C.-T., Wang, W.-J., 2012. Iphone social networking for evidence investigations using itunes forensics. In: Proceedings of the 6th International Conference on Ubiquitous Information Management and Communication. ACM, p. 62.
Watanabe, T., Akiyama, M., Sakai, T., Washizaki, H., Mori, T., 2018. Understanding the inconsistency between behaviors and descriptions of mobile apps. IEICE Trans. Info Syst. 101 (11), 2584e2599.
Zhang, X., Baggili, I., Breitinger, F., 2017. Breaking into the vault: privacy, security and forensic analysis of android vault applications. Comput. Secur. 70, 516e531.
Zhou, J., 2016. Automated app categorization using API analysis [Online]. http://www0.cs.ucl.ac.uk/staff/Y.Jia/resources/studentprojects/Kelly_Zhou_Automated_App_Categorization_usingAPI_analysis.pdf.

* cited by examiner

| # | id | name | description | url | lookup_url | bundle_id | tag |
|---|---|---|---|---|---|---|---|
| | filter | filter | filter | filter | filter | filter | filter |
| 1 | 1263488666 | Redacted - Censor Private Content remo... | Redacted - Private Content Re... | https://itunes.a... | https://itunes.a... | jack.redacted | 0 |
| 2 | 845266002 | Private Apps - Secure personal data man... | **** PRIVATE APPS *** *** PIN ... | https://itunes.a... | https://itunes.a... | com.mainhung... | 1 |
| 3 | 792410101 | Private Photo - Protect Privacy, Photo a... | Private Photos protects photos... | https://itunes.a... | https://itunes.a... | ch.b-eng.private... | 1 |
| 4 | 951306034 | Private video locker - safety protect you... | Import from a PC or Mac and pl... | https://itunes.a... | https://itunes.a... | private-video-to... | 1 |
| 5 | 651767864 | Contact Lock - Secure and Protect Your ... | Don't want other guys view yo... | https://itunes.a... | https://itunes.a... | com.stickto.Sec... | 1 |

FIG. 2

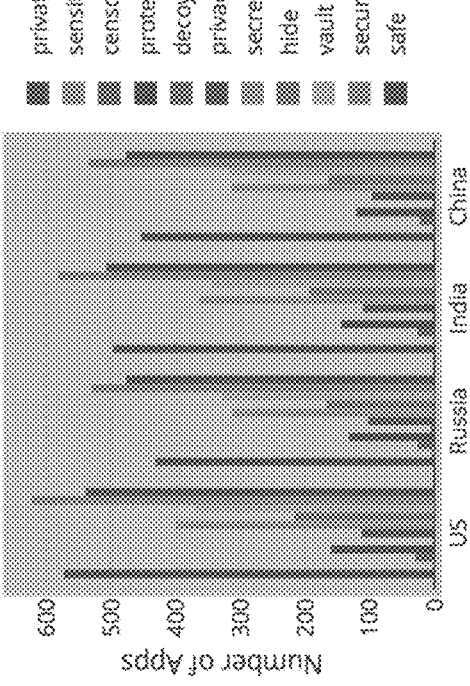

FIG. 3

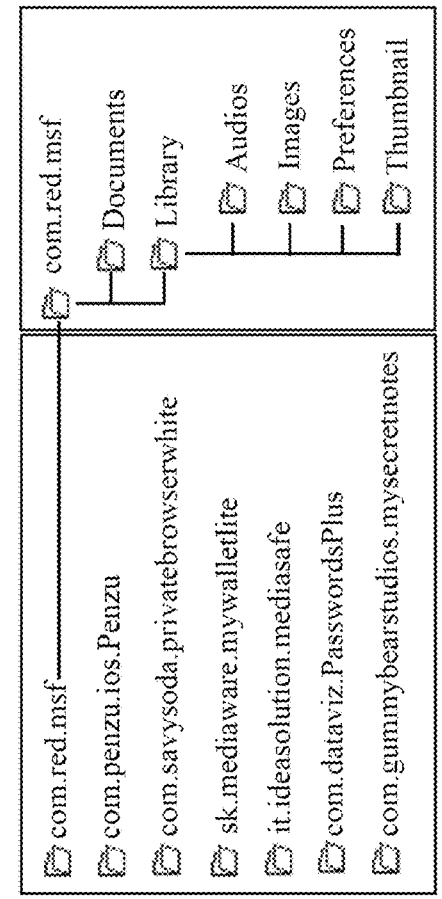

FIG. 4

| Name | Bank, card na... | Test1 | 0 | 1280544501 |
|---|---|---|---|---|
| Owner | Card holder | john appleseed | 0 | 1280544501 |
| Category | Card type | Testcard | 0 | 1280544501 |
| Kind | Card name | | 0 | 1280544501 |
| Number | | 1234 5678 12... | 0 | 1280544501 |
| Expiration | | | 0 | 1280544501 |
| CCV | Security code | 123 | 0 | 1280544501 |
| PIN | | 1234 | 0 | 1280544501 |

*FIG. 5*

| remoteFullURL | https://s3.amazonaws.com/1silo.penzu.com/16861517/photos/huge/penzu_iOS_15415... |
|---|---|
| type | Photo |
| uploadRequired | 0 |
| localFullFileNa... | 54593517-B6B6-495F-8EEF-029A64E198DD-0-full.jpg |
| localThumbFil... | 54593517-B6B6-495F-8EEF-029A64E198DD-0-thumb.jpg |
| downloadReq... | 0 |
| remoteThumb... | https://s3.amazonaws.com/1silo.penzu.com/16861517/photos/tray/penzu_iOS_154152... |
| syncedAt | 2018-11-06T12:24:35-0500 |

*FIG. 6*

| type | Journal |
|---|---|
| syncedAt | 2018-12-01T18:06:47-0500 |
| isDefault | 1 |
| passwordHint | lockedd |
| syncRequired | 0 |
| rememberPas... | 0 |
| journalEmail | setup@post.penzu.com |
| name | Mobile's Journal |
| passwordHash | $2a$10$6GHoD/AlpFVRzUOl3GufFuCU8BendSrIAwGi5nNS908mR6IxbMm |

*FIG. 7*

{'iRateEventCount': 0, 'num-albums': 1, 'correct': True, 'background': 'white', 'passcode': 'abcd', 'num-passwords': 0, 'signedUp': True, 'browser-reset': datetime.datetime(2018, 2, 17, 2, 33, 51, 838522), 'WebKitShrinksStandaloneImagesToFit': True, 'fullversion': False, 'iRateUseCount': 5, 'breakin': True, 'WebKitLocalStorageDatabasePathPreferenceKey': '/var/mobile/Containers/Data/Application/AB377F43-1347-4975-8C32-F6E008F16E42/Library/Caches', 'pending': 'abcd', 'gotbrowser': False, 'iRateFirstUsed': datetime.datetime(2018, 2, 17, 2, 32, 3, 962735), 'num-files': 0, 'limit': 5, 'cloudsync': False, 'passtype': 'alpha',

*FIG. 8*

| Part-1 | | |
|---|---|---|
| ._collections | 12/1/2018 8:01 PM | File folder |
| ._collections.fake | 12/1/2018 8:01 PM | File folder |
| .db | 12/1/2018 8:01 PM | File folder |
| .recordings | 12/1/2018 8:01 PM | File folder |
| Part-2 | | |
| thumbs | 12/1/2018 6:21 PM | File folder |
| 1.jpg.encrypted | 12/1/2018 6:16 PM | ENCRYPTE |
| 2.txt.encrypted | 12/1/2018 6:16 PM | ENCRYPTE |
| Part-3 | | |
| com.crashlytics | 12/1/2018 6:21 PM | File folder |
| key.encrypted | 12/1/2018 6:16 PM | ENCRYPTE |
| key.fake.encrypted | 12/1/2018 6:16 PM | ENCRYPTE |
| openedTabs.fake.plist | 12/1/2018 6:16 PM | PLIST File |
| openedTabs.plist | 12/1/2018 6:16 PM | PLIST File |

*FIG. 9*

| Folders | Folders | | Folders | Other |
|---|---|---|---|---|
| VaultContents | AppDomain-com.appostrophe.privatecalc | ▸ | Databases | 303cff0...0405525 |
| VaultExtracted | AppDomain-com.GalaxyStudio.PasswordSafeFree | ▸ | Images | 841bb66...aee8525 |
| | AppDomain-lockmyfolder | | Plists | c3a6e8f..f0338f66 |
| | AppDomain-my.com.pragmatic.My-Apps-Lite | ▸ | | mozilla to com |
| | AppDomain-org.whispersystems.signal | ▸ | | |

FIG. 10

VAULT IDENTIFICATION, DETECTION AND EXTRACTION REPORT

Details about the Device:
- Device Name: XXXXXX iPhone
- Phone Number: +1 (XXX) XXX-XXXX
- IMEI Number: 35XXXXXXXX1202
- Product Version: 12.3.1
- Logical Acquisition Status: Finished
- Logical Acquisition Date Time: 2019-05-10 17:04:46.278286

Total numbers of Apps Found on the Device: 70
Numbers of Vault Apps Found on the Device: 5

List of Vault Apps Detected:
1. lockmyfolder
2. com.appostrophe.privatecalc
3. my.com.pragmatic.My-Apps-Lite
4. org.whispersystems.signal
5. com.GalaxyStudio.PasswordSafeFree

Files and Artifacts Extracted:
1. App Bundle ID: lockmyfolder
   PLIST FILES:
      Library/Preferences/lockmyfolder.plist
      Library/Application Support/com.crashlytics/CLSUserDefaults.plist
   IMAGE FILES:
      Documents/PHOTOS/A6A5B438-3028-4B49-9E8F-B467356F5DB1/IMG1.jpg
      Documents/PHOTOS/8632C492-5014-434B-9F83-4DB9661CB2C5/IMG3.jpg
      Documents/PHOTOS/8632C492-5014-434B-9F83-4DB9661CB2C5/IMG2.jpg
      Documents/PHOTOS/8632C492-5014-434B-9F83-4DB9661CB2C5/IMG1.jpg
   DATABASE FILES:
      Documents/LockMyFolder.sqlite
   Any media files found? Yes
2. App Bundle ID: com.appostrophe.privatecalc
   PLIST FILES:
      Library/Preferences/com.appostrophe.privatecalc.plist

FIG. 11

CONTENT HIDING SOFTWARE IDENTIFICATION AND/OR EXTRACTION SYSTEM AND METHOD

RELATED APPLICATION

This application claims priority to, and the benefit of, U.S. Provisional Patent Application No. 63/216,767, filed Jun. 30, 2021, entitled "Content Hiding Software Identification and/or Extraction System and Method," which is incorporated by reference herein in its entirety.

BACKGROUND

Content hiding software (also referred to herein as "vault software" or "content hiding apps") is a class of applications that allow users to hide photos, videos, documents, and other content for security or privacy. A subclass of these applications referred to as "decoy apps" further supports secret hiding by having a model that mimics standard apps such as calculators but can turn into a vault-app, e.g., through entering a specific input.

There is a benefit to identify and/or extract contents of content hiding software, e.g., by companies, law enforcement, and/or cybersecurity research.

SUMMARY

An exemplary system and method facilitate the identification and/or extraction of content hiding software, e.g., in a software curation environment (e.g., Apple's App Store). In some embodiments, the exemplary system and method may be applied to U.S.-based platforms as well as international platforms in Russia, India, and China, among others.

Experimental results show that the exemplary system and method can be used in an effective and rapid manner to identify content hiding apps. In some embodiments, a two-phase process is employed to i) initial categorization using keywords and ii) a precise binary classification. Experimental results disclosed herein assisted in the understanding of the behavior and features of these vault apps and how to extract the hidden information from artifacts of the app's stored data. A fully automated vault-app identification and extraction system are also disclosed that first identifies and then extracts the hidden data from the apps on a smartphone or mobile device. Using the vault identification and data extraction system (also referred to herein as "VIDE"), law enforcement investigators can more easily identify and extract data from such apps as needed. Although vault apps are removed regularly from the App Store, VIDE can be used to identify removed apps.

In an aspect, a method is disclosed to identify content hiding software in curation platforms (e.g., App store), the method comprising identifying, via one or more classifiers, a plurality of content hiding software in a curation platform (e.g., using Gaussian Naive Bayes (GNB), Support Vector Machine (SVM) and Decision Tree (DT)), wherein the one or more classifiers have been trained/configured using textual data associated with a published title and published description of the software in published fields for software in the curation platform; and storing the identified content hiding software in a database.

In some embodiments, the method further includes identifying a software as a content hiding software by comparing the software to identified content hiding software in the database.

In some embodiments, the method further includes extracting hidden information from artifacts of the software stored data.

In some embodiments, the extracting of the hidden information includes iterating, by a processor, without user input or intervention, through an application directory for an identified vault app and extracting relevant artifacts (e.g., from plist files, json files, and sqlite database files).

In some embodiments, the one or more classifiers include at least one of Gaussian Naive Bayes (GNB), Support Vector Machine (SVM), and Decision Tree (DT).

In some embodiments, the one or more classifiers are trained using textual data that includes at least one of 'private,' 'sensitive,' 'censor,' 'protect,' 'decoy,' 'privacy,' 'secret,' 'hide,' 'vault,' 'secure,' 'safe,' 'photos,' 'videos,' 'notes,' 'passwords,' 'contacts,' 'password-protected,' 'password-protected,' 'browser,' 'private browser.'

In some embodiments, the curation platform (e.g., App Store, Google Store, etc.) is for mobile computing devices or non-mobile computing devices.

In another aspect, a system is disclosed comprising a processor; and a memory operatively coupled to the processor, the memory having instructions stored thereon, wherein execution of the instructions by the processor causes the processor to identify, via one or more classifiers, a plurality of content hiding software in a curation platform (e.g., using Gaussian Naive Bayes (GNB), Support Vector Machine (SVM) and Decision Tree (DT)), wherein the one or more classifiers have been trained/configured using textual data associated with a published title and published description of the software in published fields for software in the curation platform; and store the identified content hiding software in a database.

In some embodiments, the execution of the instructions by the processor further causes the processor to identify the software as a content hiding software by comparing the software to identified content hiding software in the database.

In some embodiments, the execution of the instructions by the processor further causes the processor to extract hidden information from artifacts of the software stored data.

In some embodiments, the instructions to extract the hidden information comprises instructions to iterate, without user input or intervention, through an application directory for an identified vault app and extract relevant artifacts (e.g., from plist files, json files, and sqlite database files).

In some embodiments, the one or more classifiers include at least one of Gaussian Naive Bayes (GNB), Support Vector Machine (SVM), and Decision Tree (DT).

In some embodiments, the one or more classifiers are trained using textual data that includes at least one of 'private,' 'sensitive,' 'censor,' 'protect,' 'decoy,' 'privacy,' 'secret,' 'hide,' 'vault,' 'secure,' 'safe,' 'photos,' 'videos,' 'notes,' 'passwords,' 'contacts,' 'password-protected,' 'password-protected,' 'browser,' 'private browser.'

In some embodiments, the curation platform (e.g., App Store, Google Store, etc.) is for mobile computing devices or non-mobile computing devices.

In another aspect, a non-transitory computer-readable medium is disclosed having instructions stored thereon, wherein execution of the instructions by a processor causes the processor to identify, via one or more classifiers, a plurality of content hiding software in a curation platform (e.g., using Gaussian Naive Bayes (GNB), Support Vector Machine (SVM) and Decision Tree (DT)), wherein the one or more classifiers have been trained/configured using textual data associated with a published title and published description of the software in published fields for software in the curation platform; and store the identified content hiding software in a database.

In some embodiments, the execution of the instructions by the processor further causes the processor to identify a software as a content hiding software by comparing the software to identified content hiding software in the database.

In some embodiments, the execution of the instructions by the processor further causes the processor to extract hidden information from artifacts of the software stored data.

In some embodiments, the instructions to extract the hidden information comprises instructions to iterate, without user input or intervention, through an application directory for an identified vault app and extract relevant artifacts (e.g., from plist files, json files, and sqlite database files).

In some embodiments, the one or more classifiers include at least one of Gaussian Naive Bayes (GNB), Support Vector Machine (SVM), and Decision Tree (DT).

In some embodiments, the one or more classifiers are trained using textual data that includes at least one of 'private,' 'sensitive,' 'censor,' 'protect,' 'decoy,' 'privacy,' 'secret,' 'hide,' 'vault,' 'secure,' 'safe,' 'photos,' 'videos,' 'notes,' 'passwords,' 'contacts,' 'password-protected,' 'password-protected,' 'browser,' 'private browser.'

BRIEF DESCRIPTION OF THE DRAWINGS

Embodiments of the present invention may be better understood from the following detailed description when read in conjunction with the accompanying drawings. Such embodiments, which are for illustrative purposes only, depict novel and non-obvious aspects of the invention. The drawings include the following figures.

FIG. 2 shows an example database (DB) table of a set of potential vault apps extracted by the extraction engine of FIG. 1 in accordance with an illustrative embodiment.

FIG. 3 shows the numbers of potential vault apps that were found in a study using a set of scanned set keywords.

FIG. 4 shows an example directory structure for a content hiding software as evaluated in the study.

FIGS. 5, 6, 7, 8, and 9 show various extracted data of content hiding software evaluated in a study in accordance with an illustrative embodiment.

FIG. 10 shows an example of the organization of extracted vault content from an experiment performed in the study.

FIG. 11 shows an example of the high-level view that outlined various artifacts identified, all files which were extracted from the vault apps, and other useful information.

DETAILED SPECIFICATION

Figure 1:
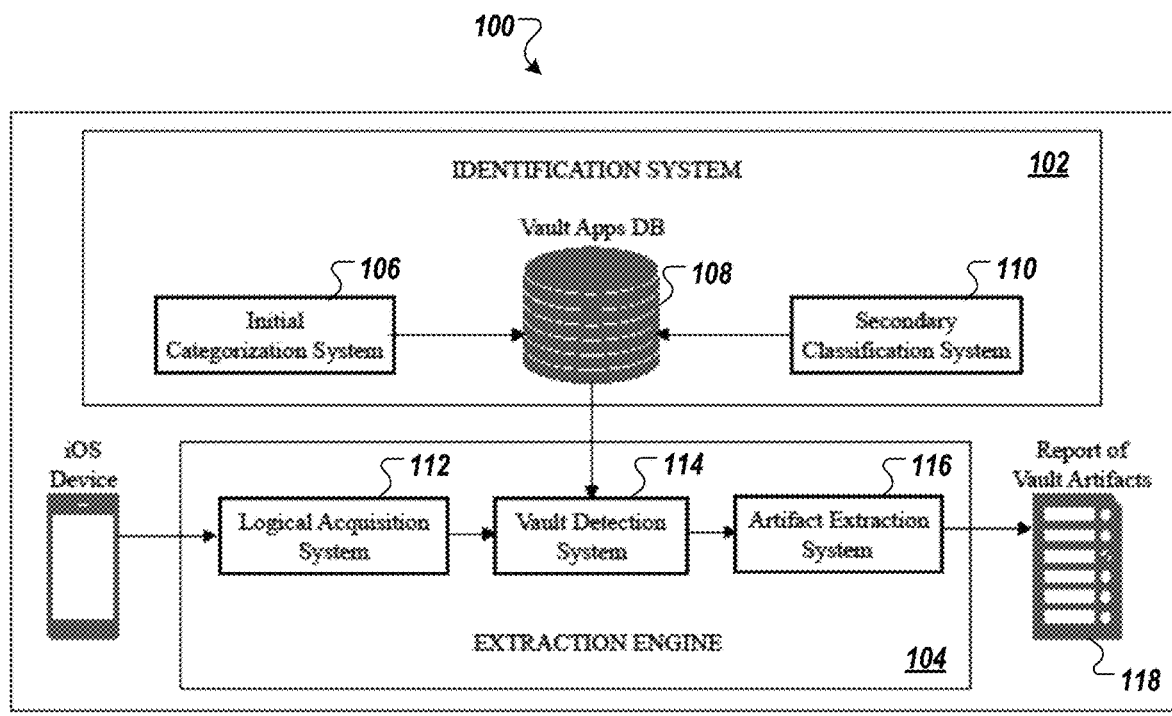
FIG. 1 shows an example system that can identify and/or extract content hiding software, e.g., in a software curation environment, in accordance with an illustrative embodiment.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the nth reference in the list. All references cited and discussed in this specification are incorporated herein by reference in their entireties and to the same extent as if each reference was individually incorporated by reference.

Although vault apps might not want to be identified as such on a smartphone, it is important that the app in the App Store be reasonably named so that a user would be able to find it for use. Information related to an app is available from the title, subtitle, and description, which are all displayed for the app in the App Store. The title and subtitle contain brief information related to the app but are usually sufficient for a user search. The description gives more detailed information about functionality. Note that the display name of the app (technically called Bundle display name by Apple) on the phone need not be the same as the title found on the app store and thus could hide the functionality of the app. For example, a vault app with the display name Calculator+had the title Calculator App Lock-Keep Secret Photo Album Safe. The exemplary system and method employ the full-text information of an app to identify it as a vault app or not.

While the user base would likely be small for such an app, Apps in the App Store are currently organized into about twenty-five categories (such as Books, Businesses, etc.). A study was conducted that mimicked a user search for content hiding apps—the study located content hiding apps in at least four categories: Photo & Video, Productivity, Utilities, and Business. The possible interfaces of most content hiding apps may include a calculator, a calling keypad, a pattern-entry keypad, a stock trading interface, a gaming interface, etc. Generally, by entering a passcode into the interface, the content hiding apps would then unlock an associated app. The content hiding apps may hide the storage of pictures, videos, and various other data. The front-facing apps often function in different modes, e.g., main mode and decoy mode. A second passcode may be required to enter the decoy mode. The apps may also support encryption of the data stored.

Example System and Method

FIG. 1 shows an example system 100 that can identify and/or extract content hiding software, e.g., in a software curation environment, in accordance with an illustrative embodiment. In the example shown in FIG. 1, the example system 100 can extract artifacts from vault apps and not from other apps on a mobile or computing device 101 (shown as "iOS Device" 101). The mobile or computing device 101 may be an Apple IOS-based device, Google Android device, Windows-based OS device, Linux-based OS device, or other operating systems. In some embodiments, the mobile or computing device may include gaming systems, home entertainment platforms, IoT devices such as smart thermostats, and the like.

In the example shown in FIG. 1, the system 100 includes an identification system 102 and an extraction engine 104. The identification system 102 may include a phase one initial categorization system 106, a database (shown as "Vault Apps Database (DB)" 108), and a phase two classification system 110 (shown as "Secondary Classification System" 110). The extraction engine 104 may include a logical acquisition system 112, a vault app detection system 114 (shown as "Vault Detection System" 114), an artifact extraction system 116, and a report generator 118. The extraction engine 104 may be performed, e.g., autonomously, on a periodic basis to maintain a database of content hiding software as curated by a curation platform.

The vault app detection system 114 of the extraction engine 104 may take input from the database 108 (e.g., Vault Apps DB). The phase one initial categorization system 106 may be configured to perform a keyword-based search on a title and/or subtitle text to determine all potential vault apps (PVAs) from a set of identified significant categories from an APP curation platform, e.g., in the App Store iTunes Preview. A potential vault app is one that is likely to be a vault app but not certain to be one. Information related to the PVAs, and particularly the descriptions, are downloaded by the extraction engine 104. The phase two secondary classification system 110 may then classify the potential vault apps more precisely into vault or non-vault, e.g., using binary classification. Results from classification may be stored in the Vault Apps DB (e.g., 108).

FIG. 2 shows an example database (DB) table of a set of potential vault apps extracted by the extraction engine 104. In the example shown in FIG. 2, only a subset of the attributes may be illustrated, including the app id (shown as "id"), the app name (shown as "name"), the App description (shown as "description"), the app location (shown as "url" and "lookup_url"), the app bundle identifier (shown as "bundle_id"), and an app associated tag (shown as "tag"). The system employed in the study was implemented using Python.

The extraction engine 104 may be configured to first perform a logical configuration acquisition of the mobile or APP device (e.g., iOS device). From the acquired data (e.g., configuration data, e.g., of the Info.plist file), the extraction engine 104 may parse the data to obtain the list of apps installed and their respective bundle identifiers. The Vault Apps DB 108 may be built using the identification system 102 to store the app title, bundle-id, and other information for each app classified as a vault app. The vault detection system 114 and the artifact extraction system 116 may be invoked to identify vault apps on the phone based on the parsed bundle-id and may then extract artifacts from the detected apps.

International app stores. The exemplary system and method can support the identification and extraction of content hiding apps in all curation platforms (e.g., App Stores in the US App Ser.tore and other non-US App Ser.tores). Curation App platform providers (e.g., Apple) may maintain curation platforms according to regions. For example, Apple may maintain the App Store for the US, Canada, and Puerto Rico in one region. Each region may support a number of separate App Stores (the sub-regions). In 2020, there may be a total of 134 App Stores. A smartphone, when connected to the internet in a certain region, can only download apps from the specific curation platform (e.g., App Store), which may be related to the billing address associated with the account of the smartphone (e.g., Apple ID account per Apple, 2019c guidelines). While it may not be possible to download apps from different regions, the exemplary system and method may nevertheless query the regional curation platforms to obtain the relevant information needed to identify content hiding apps in those regions.

Experimental Results and Additional Examples

A study was conducted to develop and evaluate the exemplary system and method (also referred to as the "Vault App Identification and Extraction" (VIDE) system) to identify content hiding software/vault apps. For the development of the identification system, the study used the US App Ser.tore, which contained approximately 2 million apps. The study focused only on a set of identified significant categories, including "Photo & Video," "Productivity," and "Utilities and Business," which contained approximately 0.5 million apps.

To address the very large number of apps, the study employed a two-phased methodology of initial keyword categorization followed by detailed binary classification. The study employed traditional classification techniques to search full-text data available based on the title, subtitle, and description available for each of the identified 0.5 million apps. Apple organized the title and subtitle differently from the description, and the time taken to download the description is substantially greater than for the title and subtitle.

To improve on the information acquisition time, the study employed a heuristic keyword search to scan only for titles and subtitles to drastically reduce the number of descriptions to download. The initial categorization provided the study with a set of apps deemed as potential vault apps (PVA). The initial categorization was used to (1) ensure that most vault apps are in the PVA set (few false negatives); (2) have a reasonable-sized PVA set but allow some number of false positives (PVA apps that do not vault apps) to be included; and (3) determine the PVA set very quickly. For a more precise classification of the PVA set into vault or non-vault, the study initially explored using a Boolean rule-based classifier.

With the PVA set, the study completed the identification of a PVA by using a classification based on the full information available about an app (title, subtitle, and description). The study employed Gaussian Naive Bayes (NB), Support Vector Machine (SVM), and Decision Trees (Tan, 2018). It was observed that further optimization was not necessary.

Initial categorization and analysis. For the initial categorization, the study first looked at the complete text information for a small set of vault applications. A set of keywords was chosen that could cover any content hiding app in the sense that at least one of the keywords must be in the app title for a user to even find a vault app. The list of eleven keywords chosen for the initial categorization was [private, sensitive, censor, protect, decoy, privacy, secret, hide, vault, secure, safe]. Other terms could have been chosen to explore fewer or greater numbers of keywords.

The set of keywords was referred to as a scanned set. When doing the initial categorization for a non-US App Ser.tore, the English words, as well as the equivalent, translated primary language word(s) were used. For the India App Store, only the English scan set was used since most of the App titles seemed to be in English rather than Hindi or other regional languages. For the Russian App store, both the English and Russian scan sets were used. And for the Chinese App Store, both the English and Chinese scan sets were used.

Sequentially scanning each app in the significant categories, the study checked the app title to determine if it contains one or more of the scanned set keywords and, if so, whether the title and app_id have been stored as a PVA in the Vault App DB (e.g., 108).

The Vault App DB (e.g., 108), in the study, included seven tables, including an apps table. In this table (e.g., FIG. 2), for each PVA found in the initial scan, all the fields were populated except bundle_id, subtitle, and tag. The name (title), description, url, and lookup_url were retrieved, which was then used to obtained the bundle_id and subtitle. The tag field stored the classification of a PVA as a vault or not vault based on the further classification. The app_id was the primary index for the Apps Table, as it is unique to an app. The exemplary system was configured to operate on different character sets such as Russian, Korean, etc. The database also contained other tables, which helped in obtaining statistical data on apps, such as which region an app was found in, or using which keyword(s).

FIG. 3 shows the numbers of potential vault apps that were found in the study using a set of the scanned set keywords (shown in the legend; only the English version is shown) for each region. It can be observed that the result of the keyword search for a given term in one region is similar to other regions, though not identically matching. Table 1 shows the example count for the Russian App Store.

TABLE 1

Region: "Russia"

| KID | (RID) | English Keyword (Russian Keyword) | Count |
|---|---|---|---|
| 1 | (12) | private (частный) | 432 |
| 2 | (13) | sensitive (чувствительный) | 4 |
| 3 | (14) | censor (цензор) | 26 |
| 4 | (15) | protect (защищат) | 131 |
| 5 | (16) | decoy (манок) | 4 |
| 6 | (17) | privacy (онфиденциальность) | 102 |
| 7 | (18) | secret (секрет) | 312 |
| 8 | (19) | hide (скрывать) | 166 |
| 9 | (20) | vault (свод) | 328 |
| 10 | (21) | secure (безопасный) | 530 |
| 11 | (22) | safe (безопасно) | 477 |
| | | Total number of apps = 1968 | |

Table 2 shows initial scan statistics for each of the regions that were analyzed in the study. The reduction using the scanned set from the original numbers of apps was observed to be uniformly substantial. For the US store with 477,002 apps in the significant categories, the initial scan reduced this set to 2364 PVAs, which is 0.50%. The time taken for the initial scan was 48 minutes (running on a MacBook Pro with Mac-OS Mojave 10.14.4, 2.3 GHZ Intel Core i5 processor, and 16 GB RAM).

TABLE 2

| Item | USA | Russia | India | China |
|---|---|---|---|---|
| Apps in significant categories | 477002 | 448389 | 451432 | 460551 |
| Number of potential vault apps | 2364 | 1968 | 2169 | 1986 |
| Run time initial categorization | 48 m, 1 s | 38 m, 1 s | 39 m, 43 s | 39 m, 37 s |

Table 3 shows the number of vault apps found using each scan set element on the US store. The scans were divided into the identified significant categories. Each app in the App Store were associated with a "primary category" or a "secondary category" (Apple, guideline 2019b).

TABLE 3

Region: "US"

| | App categories | | | |
|---|---|---|---|---|
| Keywords | Business | Utilities | Productivity | Photo-Video |
| "private" | 109 | 331 | 202 | 204 |
| "sensitive" | 0 | 2 | 1 | 1 |
| "censor" | 1 | 15 | 0 | 27 |
| "protect" | 37 | 110 | 43 | 26 |
| "privacy" | 14 | 80 | 54 | 22 |
| "secret" | 37 | 276 | 117 | 166 |
| "hide" | 8 | 158 | 56 | 135 |
| "vault" | 55 | 254 | 125 | 178 |
| "secure" | 216 | 367 | 324 | 72 |
| "safe" | 114 | 357 | 176 | 119 |
| Total App Count | 679 | 1760 | 1099 | 798 |

TABLE 3-continued

Table 4 shows statistics for the numbers of PVA apps found in the US store as well as other regions. 1735 apps were common to all the four regions: US, Russia, India, and China.

TABLE 4

| Region | Count |
|---|---|
| Apps found in the US region as well as the Russian region | 1831 |
| Apps found in the US region as well as the Indian region | 2015 |
| Apps found in the US region as well as the Chinese region | 1836 |
| Apps found in the US, Russia, India, and China regions | 1735 |

Of the 2364 PVAs from the US App Ser.tore, it was found that 178 were removed within a period of 3 months from the date of the initial scan. However, these apps still continued to be fully functional on iOS devices on which they were previously installed. Users are unfortunately not informed about the app removal nor the cause for the removal. According to Apple, the cause of app removal from the App Store could be due to various reasons such as the app being found to be malicious (Apple, 2019d; Davey Winder, 2019), outdated, or crashing on launch (Apple, 2019a). The fact that 7.5% of PVAs were removed by Apple within three months of the initial scanning shows that many apps being used in practice no longer have any information about them in the App Store.

To address these dynamics in the data, the exemplary system may be configured to periodically scan a curation platform (e.g., App Store) to identify new vault apps. The exemplary system would also continue to maintain a list of previous vault apps found even if they have been removed from the curation platform (e.g., App Store). Manually trying to identify vault apps on phones by checking the App store may not find these historically available but now removed apps.

Classification and analysis. The study first manually labeled the 2364 PVAs. For the manual labeling, each app was classified using the app URL and all the information available about each app which was a title, subtitle, description, and the app icon. The study classified each app as vault or non-vault using the full obtained information. Any app not unanimously labeled was reviewed separately with additional reviewers. The basic guidelines for deciding whether an app was a vault app or not was whether or not the goal of the app was to hide any information, essentially whether it was used for anti-forensic purposes.

Some other features of each app were also noted: decoy, spying, dual-mode, supports encryption, and password storage. The manual labeling of the PVA set in the study resulted in 1118 apps with the label "vault" and 1246 apps with the label "non-vault."

The performance of our initial scan was evaluated on a set of randomly chosen 600 apps from the App Store in the significant categories.

ML-based binary classification. For the second phase of the binary classification, the study implemented three different binary classifiers, including Gaussian Naive Bayes (GNB), Support Vector Machine (SVM), and Decision Tree (DT). For the purpose of binary classification, additional keywords (features) were heuristically added to the previous list of 11 keywords resulting in a total of 20 keywords that were referred to as the feature set. The features try to minimize false positives, such as banking-related apps and safety apps that were picked up in the initial scan but were not vault apps.

The binary classification into vault/non-vault was based on the occurrence or not in full-text information available for a PVA app, including app title, app sub-title, and app detailed description. The full feature set included ['private,' 'sensitive,' 'censor,' 'protect,' 'decoy,' 'privacy,' 'secret,' 'hide,' 'vault,' 'secure,' 'safe,' 'photos,' 'videos,' 'notes,' 'passwords', 'contacts,' 'password-protected,' 'password protected,' 'browser,' 'private browser']. When using a different language, the occurrence is true if either the keyword or the translated keyword appears.

The full labeled dataset included 2963 applications. This labeled dataset had 1118 vault and 1845 non-vault apps. For the training and test set, all the 1118 vault apps and 690 were used as randomly chosen apps from the 1845 non-vault apps for a total of 1808 apps. The training and testing datasets were partitioned into 60% (Training Set) and 40% (Test Set) with random seeds. A 4-fold cross-validation operation was used for each classifier type. Tables 5-7 show the classification reports for the Gaussian Naive Bayes (GNB) classifier, Support Vector Machine (SVM) classifier, and Decision Tree (DT) classifier, respectively. Table 8 shows the estimated number of vault apps.

TABLE 5

|  | Precision | Recall | F1-Score |
|---|---|---|---|
| 0 (non-vault) | 0.73 | 0.93 | 0.82 |
| 1 (vault) | 0.95 | 0.79 | 0.86 |
| Average | 0.87 | 0.84 | 0.85 |

TABLE 6

|  | Precision | Recall | F1-Score |
|---|---|---|---|
| 0 (non-vault) | 0.91 | 0.83 | 0.86 |
| 1 (vault) | 0.90 | 0.95 | 0.92 |
| Average | 0.90 | 0.90 | 0.90 |

TABLE 7

|  | Precision | Recall | F1-Score |
|---|---|---|---|
| 0 (non-vault) | 0.82 | 0.89 | 0.85 |
| 1 (vault) | 0.93 | 0.88 | 0.90 |
| Average | 0.89 | 0.88 | 0.88 |

TABLE 8

| Classifier | US | Russia | India | China |
|---|---|---|---|---|
| Gaussian Naive Bayes | 1091 | 768 | 874 | 767 |
| Support Vector Machine | 1680 | 1272 | 1413 | 1263 |
| Decision Tree | 1412 | 1037 | 1171 | 1038 |

The classification reports and other examples are shown in Dorai et al., "VIDE-Vault App Identification and Extraction System for iOS Devices," Forensic Science International: Digital Investigation, Volume 33, Supplement, July 2020.

Machine Learning. In addition to the machine learning features described above, the analysis system can be implemented using one or more artificial intelligence and machine learning operations. The term "artificial intelligence" can include any technique that enables one or more computing devices or comping systems (i.e., a machine) to mimic human intelligence. Artificial intelligence (AI) includes but is not limited to knowledge bases, machine learning, representation learning, and deep learning. The term "machine learning" is defined herein to be a subset of AI that enables a machine to acquire knowledge by extracting patterns from raw data. Machine learning techniques include, but are not limited to, logistic regression, support vector machines (SVMs), decision trees, Naïve Bayes classifiers, and artificial neural networks. The term "representation learning" is defined herein to be a subset of machine learning that enables a machine to automatically discover representations needed for feature detection, prediction, or classification from raw data. Representation learning techniques include but are not limited to autoencoders and embeddings. The term "deep learning" is defined herein to be a subset of machine learning that enables a machine to automatically discover representations needed for feature detection, prediction, classification, etc., using layers of processing. Deep learning techniques include but are not limited to artificial neural networks or multilayer perceptron (MLP).

Machine learning models include supervised, semi-supervised, and unsupervised learning models. In a supervised learning model, the model learns a function that maps an input (also known as feature or features) to an output (also known as target) during training with a labeled data set (or dataset). In an unsupervised learning model, the algorithm discovers patterns among data. In a semi-supervised model, the model learns a function that maps an input (also known as feature or features) to an output (also known as a target) during training with both labeled and unlabeled data.

Neural Networks. An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can be arranged in a plurality of layers such as an input layer, an output layer, and optionally one or more hidden layers with different activation functions. An ANN having hidden layers can be referred to as a deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tanh, or rectified linear unit (ReLU) function), and provide an output in accordance with the activation function. Additionally, each node is associated with a respective weight. ANNs are trained with a dataset to maximize or minimize an objective function. In some implementations, the objective function is a cost function, which is a measure of the ANN's performance (e.g., error such as L1 or L2 loss) during training, and the training algorithm tunes the node weights and/or bias to minimize the cost function. This disclosure contemplates that any algorithm that finds the maximum or minimum of the objective function can be used for training the ANN. Training algorithms for ANNs include but are not limited to backpropagation. It should be understood that an artificial neural network is provided only as an example machine learning model. This disclosure contemplates that the machine learning model can be any supervised learning model, semi-supervised learning model, or unsupervised learning model. Optionally, the machine learning model is a deep learning model. Machine learning models are known in the art and are therefore not described in further detail herein.

A convolutional neural network (CNN) is a type of deep neural network that has been applied, for example, to image analysis applications. Unlike traditional neural networks, each layer in a CNN has a plurality of nodes arranged in three dimensions (width, height, depth). CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by downsampling). A fully-connected layer includes neurons, where each neuron is connected to all of the neurons in the previous layer. The layers are stacked similar to traditional neural networks. GCNNs are CNNs that have been adapted to work on structured datasets such as graphs.

Other Supervised Learning Models. A logistic regression (LR) classifier is a supervised classification model that uses the logistic function to predict the probability of a target, which can be used for classification. LR classifiers are trained with a data set (also referred to herein as a "dataset") to maximize or minimize an objective function, for example, a measure of the LR classifier's performance (e.g., an error such as L1 or L2 loss), during training. This disclosure contemplates that any algorithm that finds the minimum of the cost function can be used. LR classifiers are known in the art and are therefore not described in further detail herein.

A Naïve Bayes' (NB) classifier is a supervised classification model that is based on Bayes' Theorem, which assumes independence among features (i.e., the presence of one feature in a class is unrelated to the presence of any other features). NB classifiers are trained with a data set by computing the conditional probability distribution of each feature given a label and applying Bayes' Theorem to compute the conditional probability distribution of a label given an observation. NB classifiers are known in the art and are therefore not described in further detail herein.

A k-NN classifier is an unsupervised classification model that classifies new data points based on similarity measures (e.g., distance functions). The k-NN classifiers are trained with a data set (also referred to herein as a "dataset") to maximize or minimize a measure of the k-NN classifier's performance during training. This disclosure contemplates any algorithm that finds the maximum or minimum. The k-NN classifiers are known in the art and are therefore not described in further detail herein.

A majority voting ensemble is a meta-classifier that combines a plurality of machine learning classifiers for classification via majority voting. In other words, the majority voting ensemble's final prediction (e.g., class label) is the one predicted most frequently by the member classification models. The majority voting ensembles are known in the art and are therefore not described in further detail herein.

Forensic analysis of vault apps. The study conducted detailed analyses of several vault apps and evaluated the relevant artifacts and storage paths. The study observed two popular types of acquisition methods: logical and physical. Logical acquisition is used to extract user data from the file system and does not include deleted files. An approach for leveraging the iPhone backup files created using the iTunes backup utility was presented by Bader and Baggili (2010) and Morrissey and Campbell (2011). Most of the allocated data may be retrieved using the backup methodology, as stated by Hoog and Strzempka (2011). This method has also been considered a leading logical acquisition method for iOS devices by Tso et al. (2012).

The exemplary system and method may employ analysis derived from the investigation of files and folders obtained using the logical acquisition of two iPad devices: one non-jailbroken device and one jail-broken device. A factory reset of the iOS device was performed to wipe all previous contents and settings before any experiments were conducted. iOS 9.3.5 was installed on one of the iPad device, followed by the installation of several software package managers. ZJailbreak (Jailbreak11, 2018), Cydia (Freeman, 2018a), and various file system tools (AppleBetas, 2018; Freeman, 2018b) were used for rooting a device. Table 9 shows a list of tools and their uses employed in the study. The jail-broken device had limitations on the version of apps that could be installed, as many newer applications require iOS 10 or above.

TABLE 9

| Software/Device | Source | Purpose |
| --- | --- | --- |
| ZJailbreak | Jailbreak11 | For jailbreaking |
| Cydia | Jay Freeman | File system software |
| Impactor | Jay Freemen | To install IPA files |
| OpenSSH | OpenBSD Project | To use a Secure shell |
| MTerminal | AppleBetas | For iOS terminal commands |
| idevicebackup2 | libimobiledevice | Backup utility tool |
| Google Translate | Google | Keyword translations |
| iPad (iOS 9.3.5) | Apple Inc. | Experimental Device-I |
| iPad (iOS 10.3.3) | Apple Inc. | Experimental Device-II |
| iPhone (iOS 12.3.1) | Apple Inc. | Experimental Device-III |

In general, content hiding applications were protected by either a biometric, PIN, or alphanumeric password. Access to the content within the application may only be granted if the correct authentication information is provided. Content hiding applications were used for various purposes such as: storing multimedia, storing passwords, private browsing, decoy mode of operation, and spying and storing encrypted contents such as images and text.

Multimedia vault apps typically allow users to capture and store photos, videos, and audio recordings. This was the most popular type of content hiding app, as users often seek a safe method to hide personal media from prying eyes. Another type of vault app was primarily meant for hiding passwords (banking, email accounts, etc.) and used textual content storage. The template-like structures used in these apps allowed users to customize their data organization by adding and renaming fields. Another popular category of vault apps was those used for private browsing. Using the underlying web-browsing mechanism by Apple, users were able to "privately" browse the internet without leaving any trace of their history.

These apps contained a very minimalist browser as a primary interface, and some also have the capability of saving bookmarks. A very interesting category of vault apps were those that have a Decoy mode. The decoy/ghost/fake mode is an interface within a content hiding app that can perform one of these two functions: (i) store data (photos, videos, etc.) using a passcode different from the passcode used for the main mode and (ii) behave as a different app (other than content hiding) such as a calculator or clock, to appear as an innocent non-vault application.

The decoy capability presented an extra layer of difficulty for investigators attempting to look up data on a suspect's iPhone device. Based on manual verification and categorization of vault applications, the decoy applications appeared to have a different function (using a decoy interface) or contain a separate data set (in the decoy mode) and are primarily used for multimedia storage.

The exemplary automated analysis of the study iterated through the application directory (obtained using logical acquisition) for each identified vault app and extracted relevant artifacts. To configure the analysis, a set of known vault applications was analyzed to determine the functionality, features, and data storage structures. For the analysis, the study (i) downloaded the app, added some user content, and identified features and functionality by interacting with the app, (ii) used logical acquisition selectively extract the relevant vault app folders, and (iii) explored stored artifacts and storage structures and extracted the data.

The logical acquisition process resulted in a file structure with hashed file/folder names (Piccinelli and Gubian, 2011). The "Manifest.plist" file contains a list of hashes that can be matched with each individual application-specific folder. Applications were installed on both the iOS devices (jailbroken and non-jailbroken). The jailbroken device (with iOS 9.3.5) was not compatible with some applications due to the minimum OS requirement of iOS 10; hence, on the jailbroken device, a restricted number of applications was employed for the analysis.

Apps, including "My Wallet Lite" (bundle id: sk.mediaware.mywalletlite), "My Browser White" (bundle id: com.savysoda.privatebrowserwhite), "My Secret Notes" (bundle id: com.gummybearstudios.mysecretnotes), "Private Journal" (bundle id: com.penzu.ios.Penzu), "Secret Photos" (bundle id: it.ideasolution.mediasafe), "My Secret Folder" (bundle id: com.red.msf), and "Passwords+" (bundle id: com.dataviz.PasswordsPlus) were evaluated based on their different purposes, such as private browsing, photo storage, potential encryption, etc. User data from the selected content hiding applications were recovered through the extraction and analysis. Typically, most third-party applications obtained using logical acquisition have very similar directory structures at the top level.

FIG. 4 shows an example directory structure for a content hiding software. This structure includes a "Documents" folder and a "Library" folder. Specifically, FIG. 4 shows the directory structure for the application "My Secret Folder," which had the capability of storing images, audio, and notes. The directory structure was observed to be similar to several content hiding applications that were evaluated. In general, the high-level components of most content hiding applications included (i) database files (.db or.sqlite) with links to images (such as on Amazon servers), (ii) sub-folders with images/thumbnails/audio, and (iii) plist files containing user/application metadata. The study also manually analyzed certain forensic artifacts retrieved related to some of the apps. Many of the apps used some type of database file to store application metadata. From these files, content such as contacts, banking information, passwords, and other sensitive data were recovered.

FIGS. 5, 6, 7, 8, and 9 show various extracted data of content hiding software evaluated in a study in accordance with an illustrative embodiment. FIG. 5 shows extracted data for a first content hiding software app, My Wallet Lite app. FIGS. 6 and 7 show extracted data for a second content hiding software app, Penzu. FIG. 8 shows extracted data for a third content hiding software app. FIG. 9 shows extracted data for a fourth content hiding software app, Secret Photos. The manual analysis provided information about the example structures of vault files, folders, databases, etc., that allowed for the development of an automatic data extraction component for vault apps. Using logical acquisition, similar information was obtained from both jailbroken and non-jailbroken devices. Indeed, the exemplary system may be employed on regular non-jailbreak phones to extract content from content hiding software.

First example—my Wallet Lite app. FIG. 5 shows artifacts extracted from the sqlite database file of the My Wallet Lite app. The artifacts are located within the Documents folder in this example. In FIG. 5, the columns from left to right include description, sub-description, value, record-deleted, and timestamp. The example shows credit card information (for one card) that the study used in the app. The values highlighted are elements that were manually inputted by the authors to be stored in the MyWallet Lite vault app. The expiration date was empty as the study did not enter this information. The last column in FIG. 5 shows the time when the study entered the data. The database table was viewed using an open-source tool called sqlite browser, which allowed the user information to be obtained from the desired columns with an SQL command. Note that no knowledge of the passcode for the app was needed to access this information.

Second example—Penzu. FIG. 6 shows artifacts extracted of the Penzu app. Penzu is a free application that is designed to let users create journals with multimedia features. While this app does not use encryption of content, it allows for journals to be locked with an alphanumeric password. Following an edit to a journal, all changes are saved to the device as well as to Penzu's servers which allows for broader accessibility. This feature was only possible since the application required an account registration before inputting any content. From the Penzu application folder, the study found the user's data regardless of whether or not the journal was locked with a passcode. Several artifacts, including a thumbnail of images and files, were recovered from the "Documents" directory of this app. Of particular interest was the database file labeled "penzu.db". This file was the key component to gaining access to the content stored on Penzu's server running in Amazon AWS (see FIG. 6-a value of 'remoteFullURL'). The remote URL was contained within the database and contained links to all images that are enclosed within journals on the device. Access to this image did not require logging into the Penzu account.

FIG. 7 shows metadata that could be extracted from the Penzu app, including a password hint for the journal, the first name of the user ("Mobile"), and an associated password hash from the account. The study was able to access sensitive data from the Cloud by accessing stored URL information.

Third example—my Secret Folder. My Secret Folder is a vault app that stores photos, videos, and notes. My Secret Folder allowed the user to store multimedia data where photos are stored in respective albums in the application. All data were observed to be stored (unencrypted) in the Library folder. The naming convention for the application followed the pattern of the album name followed by the image number. Audio files (.m4a format) were stored in a corresponding directory called "Audios" and named with a timestamp at the time of recording. Another feature of this application included "break-in reports," which is log-based documentation of any invalid login attempts. In the My Secret Folder app, the app would capture a photo automatically using the front camera upon every invalid login. The location coordinates were also stored while the invalid login took place. This data was recovered by accessing the "secretfolder.sqlite" database file from within the application folder.

Fourth example—Secret Photo. Secret Photos-KYMS Free (IdeaSolutions, 2018) was an application within the study that advertised "military-grade AES-encryption." This free version of a paid app allowed the users to store photos, videos, recordings, and documents in an encrypted manner. The directory structure within the backup was similar to the other applications; however, there were no unencrypted media locally stored within the application folder. Likewise, the database file required a key to open. An investigator can identify that the content has been added to the application by noticing [filename].jpg.encrypted, or the like. The study extracted user data from this application by identifying unencrypted strings from the database files. While some strings of the database were in plain text, the majority of other files were encrypted. KYMS stored the decoy mode contents in the "._collections.fake" directory, and maintained separate encryption keys. FIG. 9 shows the decoy mode content (see part 3) for this content hiding software. FIG. 9 also shows the recovered files and folders for this content hiding software.

Automated extraction engine. The study used an extraction engine (e.g., exemplary extraction engine) to extract all retrievable information from each vault app on a target device. The vault detection system component of the extraction engine was used to compare the bundle Ids stored in the Vault Apps DB with the bundle Ids of all applications installed in the phone in order to determine which are the vault apps in the iOS device. The artifact extraction system then extracted only the artifacts from these vault apps. To get this data, the possible storage structures of the data stored by (third-party) vault apps were employed, which was described herein.

The engine relied on certain device manufacturer's policies that required developers to follow certain developer guidelines laid out by the device-manufacturer in order to organize data storage within iOS applications. Hence, most applications tend to use popular file types such as plist files, json files, and sqlite database files, and stored them within the Preferences, Library, and Document containers (iOS app directories). When an unlocked iOS device was connected to a computer, followed by the launching of the VIDE tool employed in the study, the computer and the iOS device were paired, and the logical acquisition was made. VIDE then extracted the relevant files and folders from the detected vault apps and parsed them appropriately. The extraction engine first organized the extracted artifacts by the App's Bundle-ID and artifact type to provide a high-level overview. FIG. 11 shows an example of the high-level view that outlined various artifacts identified, all files which were extracted from the vault apps, and other useful information. More detailed information about each plist file, sqlite file, image files, etc. were then identified for each vault app.

FIG. 8 shows an example of a plist file that was extracted from one of the vault apps. From FIG. 8, it can be observed that various information can be readily determined, including the passcode information, whether the cloud was used to back up the artifacts or not, whether the cloud syncing feature was turned ON, and whether the app can function in dual mode or not. Such information was identified by searching for various keywords such as pass, passcode, cloud, sync, mode, alternate, etc., in the plist/json files. The study additionally listed the schema, tables, and columns of any database files and related metadata. This information thus identified aspects such as break-in and the date and time at which a file/content was stored, whether any attempt was made to delete a particular content, etc., in addition to the data entered by the user and stored by the vault app. Once a vault app has been detected by the VIDE system, the study identified the app group location using the Manifest.db file. Based on the file type/content, the study was placed in one of four folders inside a folder named after the apps's bundle identifier: Plists, Databases, Media and Others. For example, files with extensions jpeg, jpg, png, mov, mp3, and wav were classified as Media files. FIG. 10 shows an example of the organization of extracted vault content from an experiment performed in the study.

Experiment Results. To test VIDE, several experiments were performed. In the study, various vault applications were downloaded and installed on iOS devices, including some that were identified using the initial scan list. In one of the experiments (the overview shown in FIG. 11), an iOS device was loaded with 5 different vault applications randomly chosen from the App Store. Their Bundle-IDs are: com.GalaxyStudio. PasswordSafeFree, com.appostrophe.privatecalc, my.com.pragmatic.My-Apps-Lite, org-.whispersystems.signal and lockmyfolder. The iOS device already had about 65 apps installed in it. All of the vault apps were populated with some random data that were inputted. It was found that VIDE was able to extract most of the artifacts from these vault apps. Irrespective of whether a vault app's album was protected with a passcode or not, VIDE was able to extract all images from that album. There are certain types of data extraction, however that VIDE is not able to support currently.

Consider the example of "my.com.pragmatic.My-Apps-Lite.plist" which represents the Bundle-ID of a vault app that is backed up in the cloud, it contained a PICODB file which VIDE extracted and placed in the Others folder. In another instance, VIDE extracted the contents of a private messaging (content hiding) vault application.

Discussion

The term content hiding app refers to apps that allow users to hide photos, videos, documents, and other files secretly and in a secure way on their smartphones. Content hiding apps use hidden folders, locking mechanisms, and sometimes encryption to implement this secure hiding. Such apps are also called vault apps, safe box apps, or app lockers. A more general term used for applications that compromise the availability of evidence is "anti-forensics" (see Harris (2006); Distefano et al. (2010); Azadegan et al. (2012)). A particular type of content hiding app called a decoy app is particularly interesting. This app operates in two modes: (1) a standard mode functioning, for example, as a calculator, and (2) a decoy mode in which the app behaves as a secure private hidden storage app for data. An example is Calculator++, available from Apple's App Store. Calculator++ can look and perform like a simple calculator in almost all respects. However, on first installing the app, the user is prompted to enter a 4-digit code (a key). Whenever a user enters this key into Calculator++, the app immediately changes behavior.

A hidden folder opens up, and the app no longer looks or behaves like a calculator. Instead, the app now lets the user capture and store photos and videos. These photos and videos do not even show up in the Photos app of the iPhone. The data is secretly stored, with access being available only through the key. In the article by Murphy (2016), the author describes various uses of content hiding apps by types of users ranging from teenagers to criminals. Teenagers use these apps to hide pictures, media and chat messages from their parents. Criminals use these apps to hide evidence of criminal acts from law enforcement. Many obvious criminal uses would be drug dealing, spying, etc.

The exemplary system and method can be employed for iOS phones and any other mobile or computing device. The exemplary system and method can be used to identify vault apps on the App Store among others. The exemplary system and method can be employed on US-based Store platform, but can be similarly deployed for App Stores in other platforms and jurisdictions, e.g., in Russia, India and China.

The exemplary system and method can be employed for effective and very fast identification of vault apps through a two-phase process: initial categorization using standard keyword search, followed by a more precise binary classification using machine learning techniques. Identified apps are stored in a database. Using the database, the exemplary system and method can determine which apps on an iPhone are vault apps. Next, a logical acquisition of the smartphone was made using iOS backup utility tools, and from this set of data, hidden data and other information from each suspect vault app are automatically extracted and presented as a report.

The exemplary system and method are referred to as a Vault Identifier and Data Extraction (VIDE) system. VIDE, in certain embodiments, is designed for iOS devices and can be extended to Android-based devices and other mobile and computing devices.

VIDE can be used by forensic investigators to quickly identify and extract relevant data from vault apps on a suspect's mobile or computing device. It could be used for forensic analysis of a live device with appropriate caution related to data stored in the cloud.

VIDE could also be useful for any user concerned about potential vault apps with private data hidden on a mobile or computing device. Additionally, the determination of vault apps on the App store could itself be of independent interest to forensic analysts.

Related Work. Commercial forensic tools such as Cellebrite UFED (Cellebrite, 2018), (Paraben, 2018) and (Oxygen, 2018) are capable of performing physical/logical acquisition and typically extract all of the data from the device. They display the data in terms of files and folders. However, there are no commercial forensic tools that identify which apps are content hiding apps in order to direct the investigator to the relevant files and folders.

Furthermore, even if one knows the targeted app of interest, these tools do not automatically extract the relevant data. Simply exploring the complete set of files and folders can cause extensive overload for the investigator. In the thesis by Zhou (2016) the author categorized apps by a set of features ("claimed functionality") by mining app descriptions as well as API calls from .apk files in Android devices. The goal of that work was to then classify apps based on these features. It was proposed that the approach would help developers decide in which App Category to place a new app. For iOS, ipa files are not readily available for third-party applications, and thus categorization by API calls is not possible. Furthermore, a focus of that work appears to entail placing the derived clusters in the proper Google Play Store category. Identifying genres such as content hiding apps that span multiple categories may be different.

Pandita et al. (2013) discussed steps toward keeping malware out of smartphone app markets. As a first step, the authors developed a framework called WHYPER, which used NLP techniques to identify sentences in app descriptions and determine whether the description supports the need for particular permissions. In a related vein, Qu et al. (2014), Watanabe et al. (2018), and Gorla et al. (2014) used textual descriptions of android applications to determine app behavior.

In contrast, the exemplary method and system can automatically and quickly identify the class of vault applications based on textual descriptions that describe the behavior.

There are very few academic papers that focus on forensics-related to content hiding apps. The paper by Rughani (2017) is one of the first to analyze content hiding android applications. The paper does an analysis of data, encryption, and file permissions for content hiding apps and shows examples of how frequently these features are used. Zhang et al. (2017) explore the details of several popular vault apps for Android devices using methods of reverse engineering and forensic analysis. Their goal was to determine how the vault apps were designed and maintained, as well as to "break" into the vault by finding passwords in the data. Duncan and Karabiyik (2018) explored the detection and analysis of vault applications on android devices. Their work differs from ours since they did not explore the issue of identification of vault apps using app descriptions, nor did they automate the forensic extraction process. It is believed that the exemplary method and system distinguish over these works in providing a comprehensive and automated identification and extraction solution.

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary embodiments include the one particular value and/or the other particular value.

By "comprising" or "containing" or "including," is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The following patents, applications and publications as listed below and throughout this document are hereby incorporated by reference in their entirety herein.

[1] Apple, 2019a. App store improvements [online]. https://developer.apple.com/support/app-store-improvements/.

[2] Apple, 2019b. Categories and Discoverability-App Store-Apple Developer. https://developer.apple.com/app-store/categories/.

[3] Apple, 2019c. Change your Apple ID country or region [Online]. https://support.apple.com/en-us/HT201389.

[4] Apple, 2019d. More malicious apps found in mac app store that are stealing user data [online]. https://appleinsider.com/articles/18/09/07/more-malicious-appsfound-in-mac-app-store-that-are-stealing-user-data.

[5] AppleBetas, 2018. MTerminal [Online]. https://github.com/AppleBetas/MTerminal-Jailed/.

[6] Azadegan, S., Yu, W., Liu, H., Sistani, M., Acharya, S., 2012. Novel anti-forensics approaches for smart phones. In: 2012 45th Hawaii International Conference on System Sciences. IEEE, pp. 5424e5431.

[7] Bader, M., Baggili, I., 2010. iPhone 3GS forensics: logical analysis using apple iTunes backup utility. In: Small scale digital device forensics journal, 4, pp. le15, 1.

[8] Cellebrite, 2018. Cellebrite. http://www.cellebrite.com. (Accessed 1 Jan. 2019).

[9] Data VizInc, 2017. Passwords Plus-Free Secure Vault on the App Store (Version 4.001). https://itunes.apple.com/us/app/passwords-plus-free-secure-vault/id486941825?mt¼8. (Accessed 21 May 2019).

[10] Davey Winder, CyberSecurity, F., 2019. Apple app store security bypassed by government ios surveillance malware [online]. https://www.forbes.com/sites/daveywinder/2019/04/09/apple-app-store-security-bypassed-by-governmentios-surveillance-malware-what-you-need-to-know/#3132b6b91b82.

[11] De Raedt, L., Passerini, A., Teso, S., 2018. Learning constraints from examples. In: Thirty-Second AAAI Conference on Artificial Intelligence.

[12] Distefano, A., Me, G., Pace, F., 2010. Android anti-forensics through a local paradigm. In: Digital Investigation. Proceedings of the 10th Annual DFRWS Conference, vol. 7. Elsevier, pp. S83eS94.

[13] Duncan, M., Karabiyik, U., 2018. Detection and recovery of anti-forensic (vault) applications on android devices. In: Proceedings of the Annual ADFSL Conference on Digital Forensics, vol. 6. Security and Law.

[14] Freeman, J., 2018a. Cydia [online]. https://cydia.saurik.com.

[15] Freeman, J., 2018b. Impactor [online]. http://www.cydiaimpactor.com.

[16] Gorla, A., Tavecchia, I., Gross, F., Zeller, A., 2014. Checking app behavior against app descriptions. In: Proceedings of the 36th International Conference on Software Engineering. ACM, pp. 1025e1035.

[17] GummyBearStudios, 2018. My Secret Notes on the App Store, version 2.0.2. https://itunes.apple.com/us/app/my-secret-notes/id437215704?mt¼8. (Accessed 21 May 2019).

[18] Harris, R., 2006. Arriving at an anti-forensics consensus: examining how to define and control the anti-forensics problem. Digit. Invest. 3, 44e49.

[19] Hoog, A., Strzempka, K., 2011. iPhone and iOS Forensics: Investigation, Analysis and Mobile Security for Apple iphone, ipad and iOS Devices. Elsevier.

[20] Idea-Solutions, 2018. Secret Photos-Kyms on the App Store, version 3.4.7. https://itunes.apple.com/us/app/secret-photos-kyms/id471303390?mt¼8. (Accessed 21 May 2019).

[21] Jailbreak11, 2018. ZJailbreak [Online]. http://zjailbreak.com.

[22] Kanzelsberger, 2014. Mywallet Lite-Secure Password Manager, version 1.5.6. https://itunes.apple.com/us/app/mywallet-lite-secure-password-manager/id423959784?mt¼8. (Accessed 21 May 2019).

[23 Kolb, S., Paramonov, S., Guns, T., De Raedt, L., 2017. Learning constraints in spreadsheets and tabular data. Mach. Learn. 106 (9-10), 1441e1468.

[24] Morrissey, S., Campbell, T., 2011. iOS Forensic Analysis: for iPhone, iPad, and iPod Touch (Apress).

[25] Murphy, C., 2016. 'What You're Missing in Hidden Apps (And 5 Data Forensic Tools!)'. https://www.officer.com/command-hq/technology/computerssoftware/data-forensics/article/12203542/hidden-mobile-apps-mobil-einvestigations-forensic-data-tools.

[26] Oxygen, 2018. Oxygen. https://www.oxygen-forensic.com/en/. (Accessed 3 Nov. 2018).

[27] Pandita, R., Xiao, X., Yang, W., Enck, W., Xie, T., 2013. WHYPER: towards automating risk assessment of mobile applications. In: Presented as Part of the $22^{nd}$ USENIX Security Symposium (USENIX Security 13), pp. 527e542. Paraben, 2018. Paraben. https://shop.paraben.com. (Accessed 6 Dec. 2018).

[28] PenzuInc, 2018. Penzu on the App Store, version 3.5. https://itunes.apple.com/us/app/penzu-free-diary-private-journal/id452674732?mt¼8. (Accessed 21 May 2019).

[29] Piccinelli, M., Gubian, P., 2011. Exploring the iphone backup made by itunes. J. Digit. Forensics Secur. Law 6 (3), 4.

[30] Qu, Z., Rastogi, V., Zhang, X., Chen, Y., Zhu, T., Chen, Z., 2014. Autocog: measuring the description-to-permission fidelity in android applications. In: Proceedings of the 2014 ACM SIGSAC Conference on Computer and Communications Security. ACM, pp. 1354e1365.

[31] RedKnight, 2018. My Secret Folder on the App Store, version 2.0.3. https://itunes. Apple.com/us/app/my-secret-folder/id489803044?mt¼8. (Accessed 21 May 2019).

[32] Rughani, D. P., 2017. Forensic analysis of content hiding android applications. Int. J. Adv. Res. Comput. Sci. Software Eng. 7, 404c408.

[33] SavySoda, 2017. Private Browsing White (Version 11.1). https://itunes.apple.com/us/app/private-browsing-white/id428855226?mt¼8. (Accessed 18 Jan. 2020).

[34] Tan, P.-N., 2018. Introduction to Data Mining. Pearson Education.

[35] Tso, Y.-C., Wang, S.-J., Huang, C.-T., Wang, W.-J., 2012. Iphone social networking for evidence investigations using itunes forensics. In: Proceedings of the 6th International Conference on Ubiquitous Information Management and Communication. ACM, p. 62.

[36] Watanabe, T., Akiyama, M., Sakai, T., Washizaki, H., Mori, T., 2018. Understanding the inconsistency between behaviors and descriptions of mobile apps. IEICE Trans. Info Syst. 101 (11), 2584e2599.

[37] Zhang, X., Baggili, I., Breitinger, F., 2017. Breaking into the vault: privacy, security and forensic analysis of android vault applications. Comput. Secur. 70, 516e531.

[38] Zhou, J., 2016. Automated app categorization using API analysis [Online]. http://www0.cs.ucl.ac.uk/staff/Y.Jia/resources/studentprojects/Kelly_Zhou_Automated_App_Categorization_usingAPI_analysis.pdf.

What is claimed is:

1. A method to identify content hiding software, the method comprising:
   pre-identifying content hiding software in curation platforms, wherein pre-identifying comprises:
      scanning titles and/or subtitles in a curation platform using a first set of keywords;
      returning title, subtitle, and bundle identifiers of a plurality of potential content hiding software;
      classifying, via one or more trained machine learning classifiers, a software from the plurality of potential content hiding software as content hiding software or non-content hiding software, wherein the one or more classifiers have been trained using a feature set comprising a second set of keywords associated with a title, subtitle, and/or bundle identifiers of software, wherein the first set of key words is smaller than the second set of keywords; and
      storing the classified content hiding software in a database as pre-identified content hiding software;
   acquiring, from a user device or a remote computing device operatively coupled to the user device, configuration data of the user device;
   parsing the configuration data into a list of installed software and respective bundle identifiers; and
   identifying installed software on the user device as a content hiding software by (i) comparing the list of installed software to pre-identified content hiding software in the database and (ii) extracting hidden information from artifacts of stored data of the installed software on the user device.

2. The method of claim 1, wherein the extracting of the hidden information comprises:
   iterating, by a processor, without user input or intervention, through an installed software directory for a classified content hiding software and extract relevant artifacts.

3. The method of claim 1, wherein the one or more classifiers include at least one of Gaussian Naive Bayes (GNB), Support Vector Machine (SVM) and Decision Tree (DT).

4. The method of claim 1, wherein the one or more classifiers are trained using the second set of keywords that includes at least one of: 'private', 'sensitive', 'censor', 'protect', 'decoy', 'privacy', 'secret', 'hide', 'vault', 'secure', 'password protected', 'browser', 'private browser'.

5. The method of claim 1, wherein the curation platform is for mobile computing device or non-mobile computing devices.

6. A system comprising:
   a processor; and
   a memory operatively coupled to the processor, the memory having instructions stored thereon, wherein execution of the instructions by the processor, causes the processor to:
      scan for titles and subtitles in a curation platform using a first set of keywords;
      return title, subtitle, and bundle identifiers of a plurality of potential content hiding software;
      classify, via one or more classifiers, a software from the plurality of potential content hiding software as content hiding software or non-content hiding software, wherein the one or more classifiers have been trained using a feature set comprising a second set of keywords associated with a title, subtitle, and bundle identifiers of software in published fields for software in the curation platform, wherein the first set of keywords is smaller than the second set of keywords;
      store the classified content hiding software in a database as pre-identified content hiding software;
      acquire, from a user device or a remote computing device operatively coupled to the user device, configuration data of the user device;
      parse the configuration data into a list of installed software and respective bundle identifiers; and
      identify installed software on the user device as a content hiding software by (i) comparing the list of installed software to pre-identified content hiding software in the database and (ii) extracting hidden information from artifacts of stored data of the installed software on the user device.

7. The system of claim 6, wherein the instructions to extract the hidden information comprises:
   instructions to iterate, without user input or intervention, through an installed software directory for a classified content hiding software and extract relevant artifacts.

8. The system of claim 6, wherein the one or more classifiers include at least one of Gaussian Naive Bayes (GNB), Support Vector Machine (SVM) and Decision Tree (DT).

9. The system of claim 6, wherein the one or more classifiers are trained using the second set of keywords that includes at least one of: 'private', 'sensitive', 'censor', 'protect', 'decoy', 'privacy', 'secret', 'hide', 'vault', 'secure', 'safe', 'photos', 'videos', 'notes', 'passwords', 'contacts', 'password-protected', 'password protected', 'browser', 'private browser'.

10. The system of claim 6, wherein the curation platform is for mobile computing device or non-mobile computing devices.

11. A non-transitory computer-readable medium having instructions stored thereon, wherein execution of the instructions by a processor, causes the processor to:
    scan for titles and subtitles in a curation platform using a first set of keywords;
    return title, subtitle, and bundle identifiers of a plurality of potential content hiding software;
    classify, via one or more classifiers, a software from the plurality of potential content hiding software as content hiding software or non-content hiding software, wherein the one or more classifiers have been trained using a feature set comprising a second set of keywords associated title, subtitle, and bundle identifiers of software in published fields for software in the curation platform, wherein the first set of keywords is smaller than the second set of keywords;
    store the classified content hiding software in a database as pre-identified content hiding software;
    acquire, from a user device or a remote computing device operatively coupled to the user device, configuration data of the user device;
    parse the configuration data into a list of installed software and respective bundle identifiers; and
    identify installed software on the user device as a content hiding software by (i) comparing the list of installed software to pre-identified content hiding software in the database and (ii) extracting hidden information from artifacts of stored data of the installed software on the user device.

12. The computer-readable medium of claim 11, wherein the instructions to extract the hidden information comprises:
instructions to iterate, without user input or intervention, through an installed software directory for a classified content hiding software and extract relevant artifacts.

13. The computer-readable medium of claim 11, wherein the one or more classifiers include at least one of Gaussian Naive Bayes (GNB), Support Vector Machine (SVM) and Decision Tree (DT).

14. The computer-readable medium of claim 11, wherein the one or more classifiers are trained using the second set of keywords that includes at least one of: 'private', 'sensitive', 'censor', 'protect', 'decoy', 'privacy', 'secret', 'hide', 'vault', 'secure', 'safe', 'photos', 'videos', 'notes', 'passwords', 'contacts', 'password-protected', 'password protected', 'browser', 'private browser'.

15. The method of claim 1, wherein the stored data comprises plist files, json files, and solite database files for one type of software application, and wherein the extracted hidden information comprises decoy data, spying data, dual mode data, supports encryption data, and/or password storage data for a second type of software application.

16. The system of claim 6, wherein the stored data comprises plist files, json files, and sqlite database files for one type of software application, and wherein the extracted hidden information comprises decoy data, spying data, dual mode data, supports encryption data, and/or password storage data for a second type of software application.

17. The computer-readable medium of claim 11, wherein the stored data comprises plist files, json files, and sqlite database files for one type of software application, and wherein the extracted hidden information comprises decoy data, spying data, dual mode data, supports encryption data, and/or password storage data for a second type of software application.

* * * * *